United States Patent
Agarwal et al.

(12) 
(10) Patent No.: US 11,100,170 B2
(45) Date of Patent: Aug. 24, 2021

(54) DOMAIN-AGNOSTIC STRUCTURED SEARCH QUERY EXPLORATION

(71) Applicant: Microsoft Technology Licensing, LLC, Redmond, WA (US)

(72) Inventors: Manoj Kumar Agarwal, Hyderabad (IN); Varun Appaswami, Hyderabad (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 20 days.

(21) Appl. No.: 16/685,030

(22) Filed: Nov. 15, 2019

(65) Prior Publication Data
US 2021/0149963 A1 May 20, 2021

(51) Int. Cl.
*G06F 16/9032* (2019.01)
*G06F 16/9035* (2019.01)
*G06F 16/906* (2019.01)

(52) U.S. Cl.
CPC ...... *G06F 16/90328* (2019.01); *G06F 16/906* (2019.01); *G06F 16/9035* (2019.01); *G06F 16/90332* (2019.01)

(58) Field of Classification Search
CPC .......... G06F 16/90328; G06F 16/9035; G06F 16/906; G06F 16/90332
USPC ....................................................... 707/767
See application file for complete search history.

(56) References Cited

U.S. PATENT DOCUMENTS

| | | | |
|---|---|---|---|
| 7,428,529 B2 * | 9/2008 | Zeng | G06F 16/3322 |
| 8,346,791 B1 * | 1/2013 | Shukla | G06F 16/248 |
| | | | 707/759 |
| 8,983,930 B2 | 3/2015 | Cheng et al. | |
| 9,129,606 B2 * | 9/2015 | Chang | G06F 16/9024 |
| 10,768,798 B1 * | 9/2020 | Porath | G06T 11/206 |
| 2005/0234879 A1 * | 10/2005 | Zeng | G06F 16/3322 |

(Continued)

FOREIGN PATENT DOCUMENTS

EP 1587011 A1 10/2005

OTHER PUBLICATIONS

Liu, Ziyang, et al., "Query Expansion Based on Clustered Results", Proc. of the VLDB Endowment, vol. 4, No. 6, Aug. 29-Sep. 3, 2011, pp. 350-361.*

(Continued)

*Primary Examiner* — Robert Stevens
(74) *Attorney, Agent, or Firm* — Medley, Behrens & Lewis, LLC

(57) ABSTRACT

A method for a search engine to provide domain-agnostic options for structured exploration based on a query. The method comprises clustering a corpus of historical queries into a plurality of query clusters. The method further comprises identifying a set of variable query terms in each query cluster. Then, a query structure of a new user query is identified, and a specific query cluster matching the query structure of the new user query is selected. Furthermore, the variable query term in the query structure of the new user query is identified. The method further comprises providing a query exploration interface offering user-selectable options for structured exploration of the new user query. Each of the user-selectable option corresponds to a variable query term in the identified set of variable query terms for the specific query cluster identified as matching the query structure of the new user query.

20 Claims, 7 Drawing Sheets

(56) References Cited

U.S. PATENT DOCUMENTS

| | | | | |
|---|---|---|---|---|
| 2008/0319944 | A1* | 12/2008 | Venolia | G06F 3/048 |
| 2009/0171929 | A1* | 7/2009 | Jing | G06F 16/3322 |
| 2014/0143223 | A1 | 5/2014 | Shi et al. | |
| 2016/0140232 | A1 | 5/2016 | Smirnov et al. | |
| 2019/0236215 | A1 | 8/2019 | Agarwal et al. | |

OTHER PUBLICATIONS

Wen, Ji-Rong, et al., "Clustering User Queries of a Search Engine", WWW '10, Hong Kong, May 1-5, 2001, pp. 162-168.*

Zhang, et al., "Generic Intent Representation in Web Search", In Proceedings of the 42nd International ACM SIGIR Conference on Research and Development in Information Retrieval, Jul. 21, 2019, 10 Pages.

Yahya, et al., "Exploratory Querying of Extended Knowledge Graphs", In Proceedings of the VLDB Endowment, vol. 9, Issue 13, Sep. 1, 2016, pp. 1521-1524.

Andoni, et al., "Approximate Nearest Neighbor Search in High Dimensions", Retrieved from: https://arxiv.org/pdf/1806.09823.pdf, Jun. 26, 2018, 27 Pages.

Athukorala, et al., "Narrow or Broad? Estimating Subjective Specificity in Exploratory Search", In Proceedings of the 23rd ACM International Conference on Conference on Information and Knowledge Management, Nov. 3, 2014, pp. 819-828.

Blanco, et al., "Entity Recommendations in Web Search", In Proceedings of 12th International Semantic Web Conference, Oct. 21, 2013, pp. 33-48.

Broder, Andrei Z, "On the Resemblance and Containment of Documents", In Proceedings of the Compression and Complexity of Sequences, Jun. 11, 1997, 9 Pages.

Chantamunee, et al., "Collaborative Filtering for Personalised Facet Selection", In Proceedings of the 10th International Conference on Advances in Information Technology, Dec. 10, 2018, 5 Pages.

Chirigati, et al., "Knowledge Exploration using Tables on the Web", In Proceedings of the VLDB Endowment, vol. 10, Issue 3, Nov. 2016, pp. 193-204.

Dou, et al., "Automatically Mining Facets for Queries from Their Search Results", In Proceedings of the IEEE Transactions on Knowledge and Data Engineering, vol. 28, Issue 2, Feb. 2016, pp. 385-397.

Jiang, et al., "Learning Query and Document Relevance from a Web-scale Click Graph", In Proceedings of the 39th International ACM SIGIR conference on Research and Development in Information Retrieval, Jul. 17, 2016, pp. 185-194.

Kharitonov, et al., "Intent Models for Contextualising and Diversifying Query Suggestions", In Proceedings of the 22nd ACM International Conference on Information and Knowledge Management, Oct. 27, 2013, 8 Pages.

Kim, et al., "Diversifying Query Suggestions Based on Query Documents", In Proceedings of the 37th International ACM SIGIR Conference on Research and Development in Information Retrieval, Jul. 6, 2014, 5 Pages.

Yanan, et al., "A Survey of Query Suggestion in Search Engine", In Journal of Chinese Information Processing, vol. 24, Issue 6, Nov. 2010, 10 pages (English Abstract).

Mei, et al., "Query Suggestion Using Hitting Time", In Proceedings of the 17th ACM Conference on Information and Knowledge Management, Oct. 2008, 9 Pages.

Miliaraki, et al., "From "Selena Gomez" to "Marlon Brando": Understanding Explorative Entity Search", In Proceedings of the 24th International Conference on World Wide Web, May 18, 2015, 11 Pages.

Pound, et al., "Facet Discovery for Structured Web Search: A Query-log Mining Approach", In Proceedings of the 2011 ACM SIGMOD International Conference on Management of Data, Jun. 12, 2011, 13 Pages.

Sadikov, et al., "Clustering Query Refinements by User Intent", In Proceedings of the 19th International Conference on World Wide Web, Apr. 26, 2010, 10 Pages.

Tsurel, et al., "Fun Facts: Automatic Trivia Fact Extraction from Wikipedia", In Proceedings of the 10th ACM International Conference on Web Search and Data Mining, Feb. 6, 2017, 10 pages.

Vandic, et al., "Dynamic Facet Ordering for Faceted Product Search Engines", In Proceeding of the IEEE Transactions on Knowledge and Data Engineering, vol. 29, Issue 5, May 2017, 14 Pages.

Agarwal, et al., "Template Trees: Extracting Actionable Information from Machine Generated", In Proceedings of the International Conference on Database and Expert Systems Applications, Aug. 9, 2018, 16 pages.

"International Search Report and Written Opinion Issued in PCT Application No. PCT/US2020/057584", dated Feb. 15, 2021, 10 Pages.

* cited by examiner

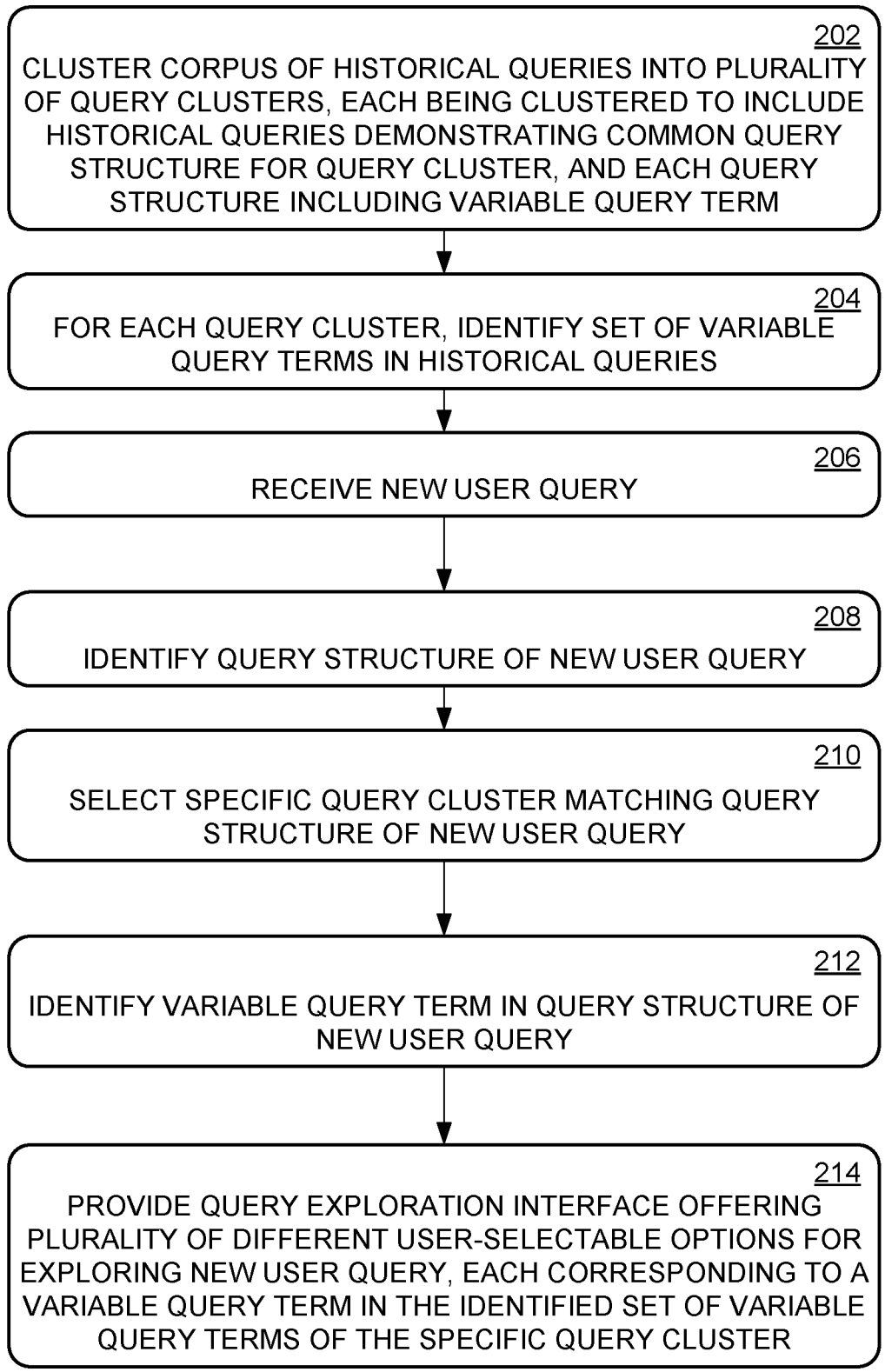

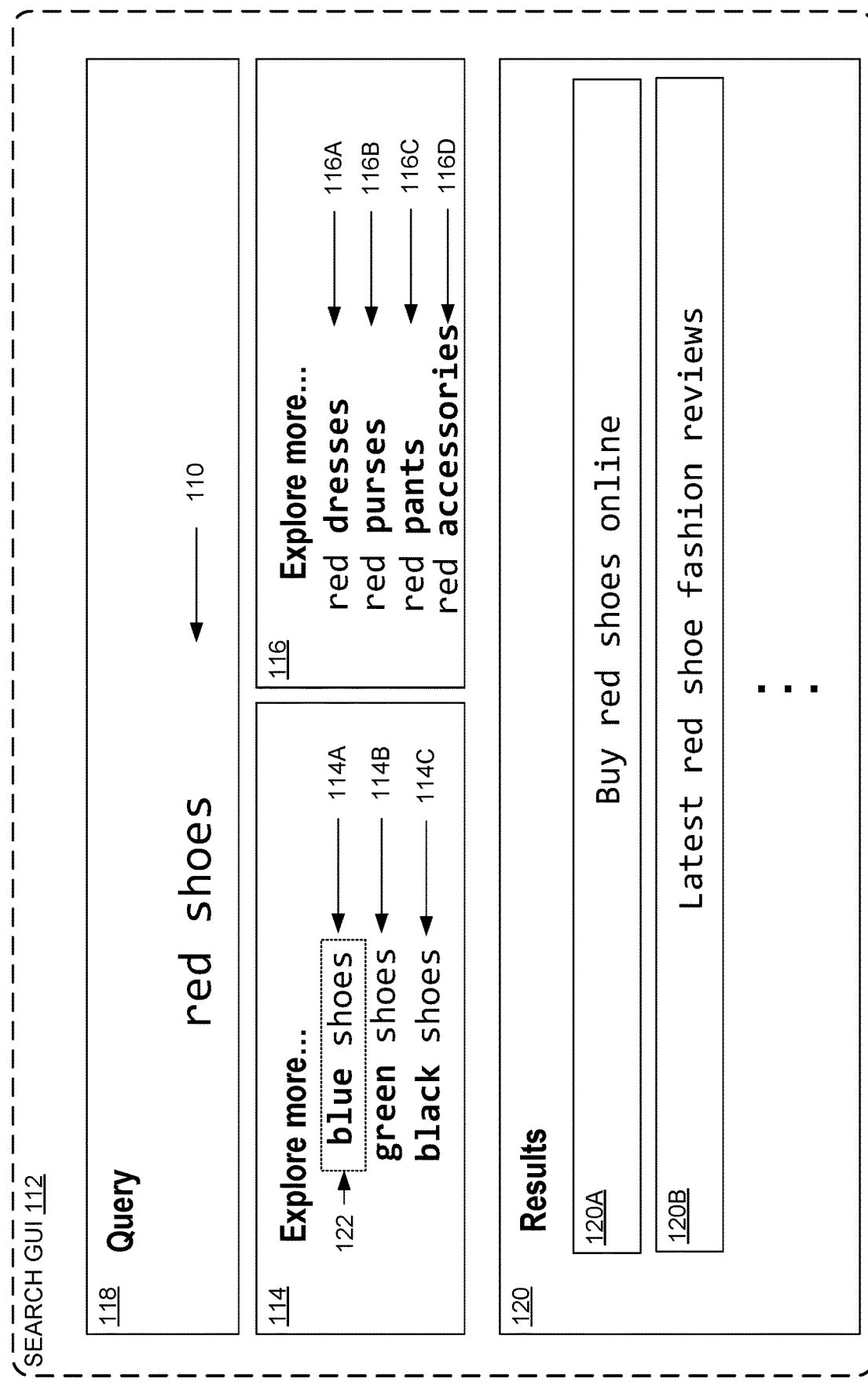

12# DOMAIN-AGNOSTIC STRUCTURED SEARCH QUERY EXPLORATION

BACKGROUND

Search engines may be configured to retrieve content related to a natural language query. A user of a search engine may wish to conduct a search by submitting more than one related query.

SUMMARY

This Summary is provided to introduce a selection of concepts in a simplified form that are further described below in the Detailed Description. The claimed subject matter is not limited to implementations that solve any or all disadvantages noted in any part of this disclosure.

A method for a search engine to provide domain-agnostic options for structured exploration based on a query comprises clustering a corpus of historical queries into a plurality of query clusters. Each query cluster of the plurality of query clusters is clustered to include historical queries demonstrating a common query structure for that query cluster. Each of the query structures includes a variable query term. The method further comprises, for each query cluster of the plurality of query clusters, identifying a set of variable query terms in the historical queries. Then, after receiving a new user query, a query structure of the new user query is identified, and a specific query cluster matching the query structure of the new user query is selected. Furthermore, the variable query term in the query structure of the new user query is identified. The method further comprises providing a query exploration interface offering a plurality of different user-selectable options for structured exploration based on the new user query. Each of the plurality of different user-selectable options corresponds to a variable query term in the identified set of variable query terms for the specific query cluster identified as matching the query structure of the new user query.

BRIEF DESCRIPTION OF THE DRAWINGS

FIG. 2 shows a method of providing domain-agnostic exploratory queries for a search query.

FIG. 3A-3D show an exemplary search user interface for structured exploration based on a query.

DETAILED DESCRIPTION

Figure 1:
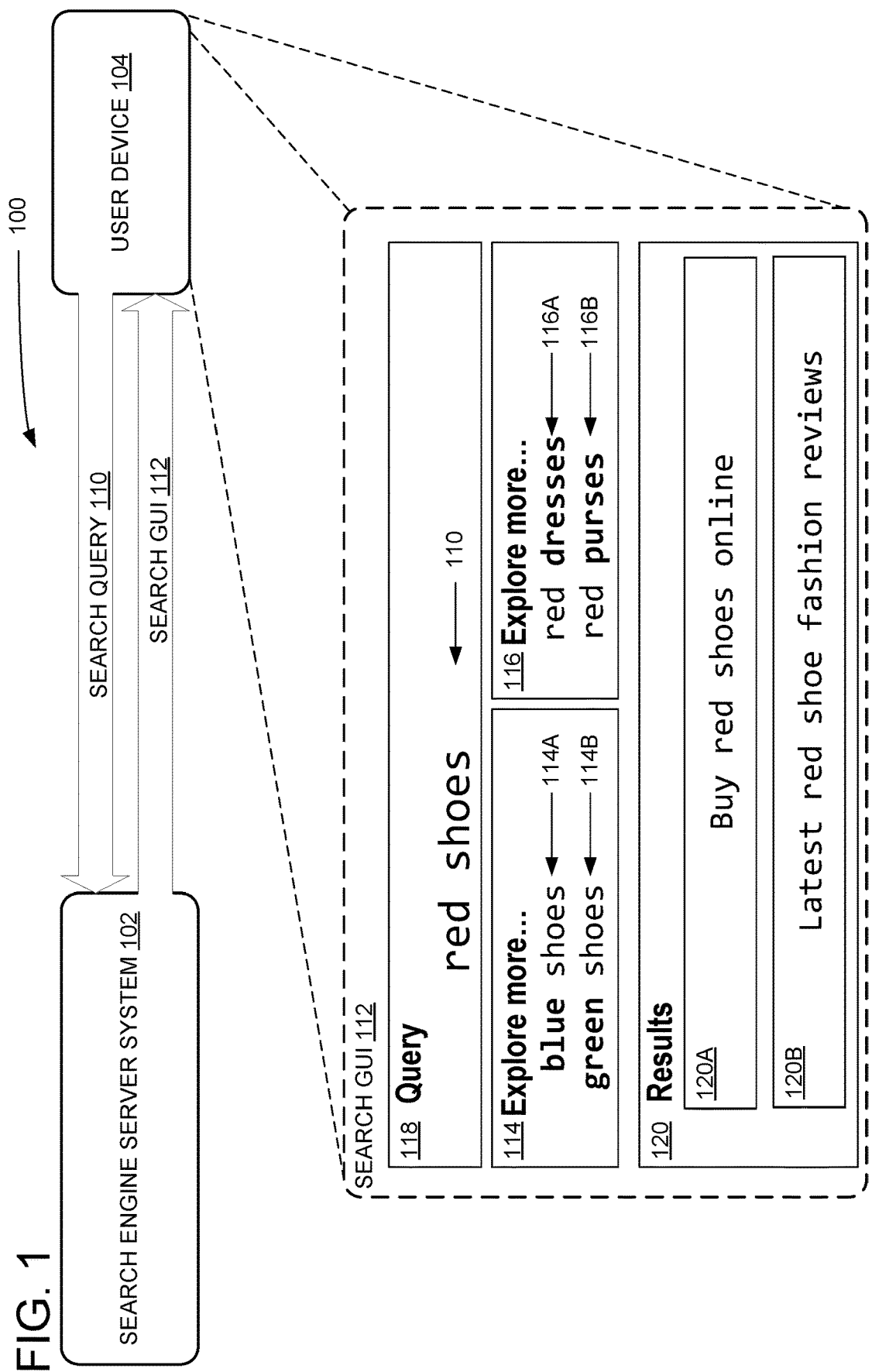
FIG. 1 shows a search engine system configured to provide domain-agnostic exploratory queries for a search query received from a user device.

Users may employ search engines to find results for search queries. In addition to finding specific results for a specific query, users may engage with a search engine interface to explore alternate queries and find further sets of search results. Accordingly, search engines may be configured to provide alternate queries in various manners.

Search engines may be configured to provide alternate query suggestions based on similarity of query, entity replacement in a query, and/or pre-defined query facets.

In approaches based on similarity of query, a search engine may provide one or more related queries based on a measure of similarity to a user-submitted query. For example, the measure of similarity may be based on a natural-language model configured to measure similarity between queries, and/or based on a measure of similarity between vector representations of queries (e.g., a semantic embedding assessed for a query by a natural language model). In some examples, similarity between queries may be based on co-occurrence of queries in user search sessions (e.g., based on an assumption that a user may search for a series of related queries during a given session). However, while related queries provided based on similarity of query may be similar to an initial user query, the structure of the relationship to the initial user query may not be exposed to the user. For example, if a user searches for "red shoes," related queries may include, e.g., "red dresses," or "blue shoes," e.g., based on mentioning similar content in the query. As another example, queries related to "red shoes," may include other search terms that users may search for when looking for red shoes, e.g., "party outfits," or "attire for dancing." However, the relationship between these queries may not be apparent to a user. For example, it may not be apparent that other, similarly related queries may be derived by varying a color mentioned in the query (e.g., "red,", "blue," or some other color) and/or by varying a garment mentioned in the query (e.g., "shoes," "dresses," or some other garment). In some examples, related queries may not have common lexical structure (e.g., "red shoes," and "party outfits") which may make the relevance of the queries less apparent to a user.

In other approaches based on entity replacement in a query, queries may be suggested to a user based on a relationship of an entity mentioned in a query to other, similar entities that are not mentioned in the query. As an example, a search engine may be configured to maintain one or more pre-defined sets of related entities, optionally including attributes which may be assessed to measure a relationship between the entities (e.g., vector encodings of entities), according to a pre-defined measure of similarity between entities. As an example, a plurality of different domain-specific sets of entities may be maintained based on a common characteristic of the entities, e.g., lists of basketball players, lists of cities, etc. Accordingly, if a query includes an entity from one of the domain-specific sets of entities, related queries may be suggested based on replacing the entity with a different entity from the same domain-specific set of entities. As an example, if a user searches for "jobs in Portland," the search engine may determine that "Portland" appears in a previously-defined set of domain-specific entities along with other, similar cities such as "Seattle" and "San Francisco." Accordingly, suggested alternate queries based on the domain-specific set of entities may include "jobs in Seattle" or "jobs in San Francisco." However, suggesting alternate queries based on similarity of entities may only be applicable when suitable domain-specific lists of entities have already been predefined (e.g., via human curators), and when an entity mentioned in a query appears in one of the lists. As such, suggesting alternate queries based on similarity of entities may be unable to generate contextually-related queries for a given query, for example when a suitable pre-defined domain-specific list of entities that includes an entity mentioned in the given query is not available (e.g., because the given query does not mention any specific entity, or because the given query mentions a specific entity not mentioned in any available pre-defined domain-specific list of entities). For example, if there is not already a pre-defined list of entities corresponding to generic concepts like colors or types of garments, then suggestions based on similarity of entities may not be applicable for search queries like "red shoes." Furthermore, even when the initial query does mention an entity that appears in one of the domain-specific, pre-defined lists of entities, replacing entities in a query based on replacing similar entities may not be suitable for a given query. As an example, if the user searched for "jobs in Portland," the user may in fact intend to search for jobs that are geographically near to the Portland, Oreg. area, for example, "jobs in Gresham," "jobs in Beaverton," or "jobs in Tigard." However, the suggested results may depend on the specific manner in which entity traits are represented. For example, depending on how entity traits are represented, other cities Gresham, Beaverton, and Tigard may be assessed to have a lower similarity to Portland than more geographically distant cities such as Seattle (e.g., based on city size, city demographics, and/or other features being considered instead of and/or in addition to geographic distance). As such, alternative queries based on similarity of entities may not be particularly relevant to a user's actual intent when conducting a query, as the relevance depends on the pre-defined sets of entities and measure of similarity between entities.

In other approaches based on pre-defined query facets, a search engine may maintain a pre-defined list of specific properties called "facets" that may be recognized in queries. Each facet may be associated with a pre-defined set of possible options. For example, a search engine for a garment shopping catalogue may be configured to recognize facets related to color and price. For example, if the user searches for "red shoes," the search engine may be configured to suggest an alternative search for "blue shoes" or "green shoes" based on changing the color from "red" to a different color option associated with the pre-defined color facet. Similarly, for the "red shoes" query, the search engine may be configured to refine the query, e.g., "red shoes under $50" or "red shoes between $50 and $100." The pre-defined facets may make structural features of a query apparent to a user, e.g., "color" is one of the facets that can influence a query for searching for a garment for purchase, and different queries can be built based on replacing "red" with different colors. However, such an approach can only provide alternative queries based on the specific, pre-defined query facets that have been manually curated. For example, even though a user who searches for "red shoes," may also be interested in searching for "red dresses," a search engine that is configured with facets for color and price and lacking a facet for "garment type" would not be able to suggest "red dresses," as an alternate query for "red shoes." Although a large plurality of pre-defined facets may be recognized by a search engine, the pre-defined facets may not be relevant to all search queries. For example, if the search engine is configured with a "garment type" facet, then the search engine may provide irrelevant suggestions for other queries for which garment type is less relevant than color or price. As an example, if the user later searches for "red pens," while the "color" and "price" facets may still be relevant, the "garment type" facet would not be relevant as the user is unlikely to be interested in seeing "red shoes" or "red dresses" based on the initial query of "red pens." In some examples, a search engine may include a plurality of different domain-specific sets of pre-defined facets. For example, a search engine for a shopping web site may apply human-curated, pre-defined facets related to specific domains related to merchandise offered by the shopping web site. As an example, the human-curated, pre-defined facets may be authored by human administrators of the shopping web site based on the products being offered, based on marketing goals for the web site, etc. For example, the search engine may apply pre-defined facets related to garment type to certain queries (e.g., based on recognizing garment-related query terms, such as "dress" or "shoe"), while applying different pre-defined facets to other queries (e.g., applying pre-defined facets related to biographical information such as "place of residence," "gender," or "height," to searches related to people, for example based on recognizing a query term including a person's name). However, even when a search engine supports a plurality of different domain-specific sets of pre-defined facets, the search engine may not find relevant facets for a given query. For example, the search engine may be missing pre-defined facets for one or more domains (e.g., due to a lack of human-curated data for that domain). As another example, the search engine may not be configured to associate a given query with a relevant domain, even when facets are defined for that domain. For example, even if there are suitable facets related to clothes, the search engine may not be configured to use a suitable domain-specific set of pre-defined facets for a search term that includes novel terminology (e.g., a query term including a new fashion brand name may not be recognized as being related to clothing). As such, alternative search queries based on pre-defined facets may not be suitably diverse and/or relevant to a given query, even when a plurality of different domain-specific sets of pre-defined facets are defined.

Another approach to providing domain-agnostic exploratory queries is described below and beneficially works with different kinds of queries, without relying on manual curation of pre-defined sets of similar entities and/or pre-defined facets. Domain-agnostic options for structured exploration based on a query may include any suitably contextually-related options based on a context of the query (e.g., based on query terms such as words in the query, previous queries submitted by a user, user configuration settings, and/or user intent underlying the query). "Structured exploration" of a query may be used herein to refer to the provision of any suitable variation on a query that may be used to conduct an expanded search, e.g., a new, exploratory query. In some examples, structure exploration may refer to expanding a query so that it includes all of the content of an initial query, with additional expanded content (e.g., adding query terms such as additional words, user utterances, and/or any other suitable query features to the initial query). For example, an initial query may be expanded to create an exploratory query including additional query terms and/or different query terms compared to an initial query. In other examples, structured exploration may refer to exploring alternate queries based on the initial query with any suitable modifications to the initial query (e.g., deleting words from the initial query, replacing words from the initial query with different words, and/or otherwise modifying the initial query in any suitable fashion to explore an expanded and/or alternate query). The generation of one or more exploratory queries based on an initial query may facilitate structured exploration based on the initial query (e.g., exploration of similar and/or different queries, with the different queries being presented in an organized fashion based on contents of the initial query).

The domain-agnostic approach described herein may be applied to different kinds of web content (e.g., different web sites and/or web data sources including any suitable content, such as multimedia content, encyclopedia content, news content, shopping content, and/or any other web-accessible content). For example, the approach described herein may be used to provide domain-agnostic query exploration for any suitable collection of web content based on historical queries related to the web content, irrespective of any specific domain(s) associated with the web content. Furthermore, the approach described herein may be implemented without requiring any human curated content (e.g., without requiring human curation of domain-specific facets). In other words, the domain-agnostic approach described herein allows exploration of queries, irrespective of any particular query domain (e.g., irrespective of query topic, data set(s) used for answering queries, and/or without requiring domain-specific, human-curated content related to the queries). Similar to approaches based on similarity of query, the domain-agnostic exploratory queries are likely to be relevant to a user query, as compared to approaches based on replacing entities and/or pre-defined facets. However, the domain-agnostic exploratory queries may also make the query structure apparent to the user so that the user can see how different related queries are obtained based on replacing query terms from an initial user-provided query. The domain-agnostic exploratory queries are determined based on a domain-agnostic clustering technique described herein, which is used to prepare clusters of similar queries. Each cluster of similar queries includes a plurality of related, alternative queries. Furthermore, the cluster of similar queries is associated with a common aspect of queries in the cluster that may be varied to obtain structurally-related queries from the cluster. For example, a query for "red shoes" may occur in a cluster of related queries for searching for shoes. Accordingly, the cluster may be associated with a common aspect related to color, thereby enabling the suggestion of alternate queries based on varying the color mentioned in a query. For example, the color may be varied to suggest queries for "blue shoes" or "green shoes" based on an initial query for "red shoes." A query may show up in more than one different cluster, and each different cluster may be associated with a different structural aspect of the query. For example, the same query for "red shoes" may show up in another cluster for "red garments," where an associated structural aspect is based on a type of garment. Accordingly, the garment may be varied to suggest queries for "red dresses," "red purses," and the like. The methods of the present disclosure are not limited to domains with specific aspects such as color and/or garment. Instead, as will be described herein, the clustering approach results in query clusters and associated structural aspects that may be varied to obtain high-quality alternative queries, irrespective of any pre-defined list of entities, pre-defined facets, etc. As compared to other approaches, the domain-agnostic query exploration approach described herein may enable a user to quickly explore related search queries, by providing structurally related queries that are related with regard to the structural aspects associated with the clusters. Alternative queries provided via the domain-agnostic query exploration approach described herein may be more diverse and/or more relevant to a user's intended search, as compared to alternative queries provided via query similarity, entity replacement, and/or pre-defined facets. The domain-agnostic approach described herein may be continually improved based on exemplary query data which may be automatically derived from historical usage and/or from live operation of a search engine system interacting with one or more users. The search engine may be configured to handle more different kinds of query (e.g., queries associated with different domains, topics, entities, etc.) based on the exemplary query data. For example, queries associated with a particular domain may be clustered together, thereby enabling the search engine to provide related queries from the particular domain by selecting queries from the cluster. More generally, different queries from multiple domains may be partitioned into any suitable plurality of clusters, thereby allowing the search engine to be automatically updated to handle new queries based on the clustering. Accordingly, structured exploration of a query may be based on related queries, irrespective of which particular domain(s) the queries may be associated with.

FIG. 1 shows a computing system 100 including a user device 104, and a search engine server system 102 configured to provide domain-agnostic exploratory queries for a given search query 110 received from the user device 104.

For example, the user query 110 may be provided via a search graphical user interface (GUI) 112 visually presented by the user device 104. User device 104 may present the search GUI based on suitable computer-executable code, for example, based on web page (e.g., HTML) code provided by search engine server system 102, based on an application installed on user device 104, and/or any other suitable computer application(s). For example, user device 104 may include a mobile device and/or a personal computer device. As a non-limiting example, search GUI 112 may include a query input box 118 configured to allow the user to input search query 110 in the form of text. As a further non-limiting example, search GUI 112 may be configured to receive a natural language utterance (e.g., as speech audio) and to input a search query 110 based on the natural language utterance. In some examples, search GUI 112 is configured to operate an automatic speech recognition system in order to fill query input box 118 with words recognized from the natural language utterance. In some examples, a search user interface may be configured to operate the automatic speech recognition system to submit a search query independently of any GUI elements (e.g., without an intermediate step of filling a query input box or displaying a graphical user interface). As another example, search GUI 112 may be configured to send a computer-readable representation of the natural language utterance (e.g., digital audio) to search engine server system 102 for processing of the natural language utterance at search engine server system 102. In some examples, search engine server system 102 may be configured to perform automatic speech recognition of the natural language utterance in order to further process the query in the form of computer-readable text. In some examples, search engine server system 102 may be configured to process queries based on the natural language utterance (e.g., without necessarily performing automatic speech recognition). For example, clustering of queries as described herein may be based on a vector representation of a natural language utterance derived from speech audio, and/or a vector representation derived from computer-readable text obtained via automatic speech recognition.

Search engine server system 102 is configured to retrieve one or more results for a user query. In some examples, search engine server system 102 may be communicatively coupled to one or more other computer systems accessible to retrieve results for a search query (e.g., databases, computer servers, cloud computing services, and/or any other computing devices and/or computing applications configured to provide search results). In some examples, server system 102 and/or other such cooperating systems may be implemented as components of an integrated computer system, e.g., a computer server, computing cluster, and/or cloud service. More generally, search engine computer system 102 includes a logic device, and a storage device holding instructions executable to perform the methods described herein. In examples, search engine computer system 102 further includes a communication subsystem configured to connect to other computer devices and/or computer networks. For example, search engine computer system 102 may be configured to communicatively couple, via the communication subsystem, to user device 104 in order to receive queries from the user device 104 and/or to provide search GUI 112 via the user device.

In some examples, query 110 may include a natural language query. For example, natural language queries may include speech audio and/or text. In some examples, natural language queries may be translated into computer-readable data with a pre-defined syntax. For example, natural language queries may be translated into plain-text, parsed into syntax trees (e.g., constituency trees and/or dependency trees), and/or translated into computer-readable commands indicating search-engine specific and/or search-engine agnostic properties of queries. As non-limiting examples, a computer-readable command may represent one or more of: 1) query terms (e.g., words, phrases, names, and/or any other text) occurring in a query; 2) user intents underlying a query (e.g., search for entity data such as biographical and/or demographic results, search for weather predictions, search for data related to consumer products, financial assets, employment, etc.); 3) entities mentioned in a query; and/or 4) metadata relating to a search session and/or user associated with a query (e.g., pertaining to the context in which the user issued the query, for example within a multi-query search session including other queries). In examples presented herein, queries are described with regard to plain-text representation of queries as an ordered sequence of characters, possibly including spaces (e.g., as a sequence of words, names, etc.). The examples presented herein are non-limiting. The techniques described herein for clustering queries and identifying common underlying structure of queries (e.g., variable query terms as will be described in detail below) may be implemented for any suitable computer-readable representation of queries, including speech audio, plain-text, computer-readable commands, and/or any other suitable representation.

Search GUI 112 includes a search result interface 120 configured to present a listing of one or more search results responsive to a received query. As shown, query input box 118 is configured to show a recent query that was input from the user (e.g., in addition to providing the recent query to search engine server system 102) so that the overall appearance of search GUI 112 includes the recent query 110 as shown in query input box 118. The search result interface 120 includes results corresponding to that same query that were retrieved by search engine server system 102. For example, the query "red shoes" may be associated with relevant internet-accessible documents summarized as result 120A and result 120B. In examples, the result 120A and result 120B may be presented as selectable links (e.g., uniform resource locator (URL) hyperlinks), which may be selected to navigate to an associated internet-accessible document. The example search results shown here are non-limiting and search results may include any number of results, with each result including any suitable content (e.g., selectable links, images, shopping results, web document titles, contents, and/or summaries, etc.).

Search GUI 112 is configured to provide one or more query exploration interfaces, for example query exploration interface 114, query exploration interface 116, and/or further query exploration interfaces not shown in FIG. 1. Further examples of query exploration interfaces are described below with regard to FIGS. 3A-D.

Query exploration interface 114 includes a plurality of user-selectable options (e.g., option 114A and option 114B) for structured exploration based on the user query 110. For example, as shown in FIG. 1, each user-selectable option of query exploration interface 114 is shown in the form of an exploratory query based on the user query. As shown, the exploratory queries include queries with alternate colors of shoes, showing the user different options for alternative queries that remain focused on "shoes" but alter the associated color term.

Similarly, query exploration interface 116 includes option 116A and option 116B for structured exploration based on the query in a different manner. Although the interfaces are shown with exploratory queries (e.g., including a replacement portion in bold and a common portion not in bold), the interfaces may alternately or additionally be configured to show any other suitable content based on the query exploration options (e.g., showing just the bolded replacement portion).

As shown, the initial query 110 may be regarded as being comprised of a plurality of query terms (e.g., "red" and "shoes"). Accordingly, each of the query exploration interfaces provides exploration options as alternatives for one of the specific query terms in the query. For example, query exploration interface 114 includes queries where the specific query term "red" is disregarded. Instead, the query is treated as though it includes a variable query term for different choices of color, and each of the options (e.g., option 114A and option 114B) is one specific query term for filling in the variable query term. Similarly, query exploration interface 116 shows queries where "shoes" is treated as a variable term, e.g., for different kinds of garments.

Although FIG. 1 shows a non-limiting example of a search interface in the form of a search GUI, search interfaces and/or query exploration interfaces may utilize any suitable human-computer interaction technologies. As a non-limiting example, a search interface may be configured to receive a query based on recognizing the query in speech audio from a user. For example, the user may initiate a search for "red shoes" by audibly saying, "Computer, search for red shoes." As another non-limiting example, a query exploration interface may include a conversational computing interface configured to conduct a natural language dialogue with a user. For example, based on an initial query, the search interface may be configured to output speech audio informing the user about possible options for an exploratory query based on the initial query. In some examples, the search interface may be configured to respond to a query by outputting speech audio descriptions of one or more search results, and further configured to emit speech audio asking a follow-up question in order to offer query exploration options. For example, in response to a user saying "Computer, search for red shoes," the search interface may be configured to output audio stating: "Here are the top two results. 1) 'Buy red shoes online.' 2) 'Latest red shoe fashion reviews.' Would you like to hear about one of the top two results, hear more results, or do another search for 'blue shoes' or for 'red dresses'?" Accordingly, the user may respond stating one or more intended actions for continuing the search. For example, the search interface may recognize a user intent to explore one of the top two results (e.g., based on recognizing any suitable utterance from the user, such as "Tell me more about the first result" or "Result number two."). Alternately or additionally, the search interface may recognize a user intent to hear more results (e.g., based on recognizing an utterance such as "tell me more results," or "hear more results."). Alternately or additionally, the search interface may recognize a user intent to do another search. For example, the search interface may recognize user selection of an exploratory query option described in speech output by the computer (e.g., based on the user saying "do another search for differently-colored shoes" or "search for other types of red clothes."). In some examples, the search interface may be configured to conduct an additional search based on the user's suggestion even when the additional search is not directly related to one of the options presented in speech output by the search interface. For example, based on hearing options to search for blue shoes or red dresses, the user may decide instead to search for "red bags," or for "casual dresses." Accordingly, the search interface is configured to recognize when the user is indicating a new search query (e.g., whether or not the new search query is related to one of the query exploration options presented by the search interface), and to respond to that query.

Options for query exploration may be based on various aspects of a search query. For example, as shown in the exemplary search GUI 112 and in query exploration interfaces 114 and 116, options for query exploration include candidate replacements for specific aspects of the user-submitted query.

The techniques of the present disclosure are not limited to providing options based on specific, pre-defined facets(s) of a search query. Instead, as will be described in further detail herein, the options that are presented for a given search query are dynamically provided, in a domain-agnostic fashion, based on the specific given search query. The options are not derived from pre-defined and/or human curated facet(s) of search queries, but instead are derived based on data regarding the search query and other, potentially similar search queries. Accordingly, the options that are presented may include particularly relevant options based on the similar search queries. Furthermore, the options that are presented may include dynamically-identified, query-specific options that may not be present in any pre-defined list of facets of search queries. Accordingly, compared to other approaches that work exclusively by substituting entities in queries and/or by substituting specific values for pre-defined facets of queries, the methods of the present disclosure may achieve more relevant and/or more diverse options for query exploration. Furthermore, because the options are derived from clusters of exemplary queries, the techniques of the present disclosure are applicable across different domains of query topics. In contrast, other approaches using substitution of entities and/or pre-defined query facets may be limited to domains for which there is relevant entity data, and/or limited to domains for which there pre-defined lists of facets are available (e.g., domains for which human curators such as human developers and/or human administrators have identified and programmed pre-defined facets). Furthermore, as new associations between queries are recognized in actual searches conducted by users (e.g., during live operation of a search engine system and/or based on historical data), the new associations may be recognized by partitioning queries into updated clusters (e.g., by adding new queries to existing clusters and/or repartitioning the query clusters based on the new queries). Accordingly, these new associations may be automatically incorporated into the search engine system, in order to provide updated options derived from the updated clusters of exemplary queries. The updated options may be provided as soon as new queries are received and automatically processed via clustering. Accordingly, updated options may be automatically recognized based on real usage data, and provided automatically without requiring human curators to explicitly recognize and/or curate suitable query exploration options. As such, the approach described herein may be able to automatically provide up-to-date query exploration options, without human intervention, as compared to other approaches for providing query exploration options (e.g., as compared to using human-curated, pre-defined, and/or domain-specific facets).

Although the example shown in FIG. 1 includes query exploration interfaces that roughly correspond to "colors" (e.g., query exploration interface 114) and "garment types," (e.g., query exploration interface 116), query exploration interfaces are not limited to being associated with a specific category and/or specific English-language description. Instead, query exploration interfaces may present any suitable set of options that may be suitable for replacing a query term. As an example, although not shown in FIG. 1, instead of replacing "red" with a color, a user may be interested in replacing "red" with another visible characteristic such as a material and/or pattern, e.g., "canvas" or "plaid," to obtain queries such as "canvas shoes," or "plaid shoes." Accordingly, query exploration interface 114 may automatically cluster relevant query options in order to present any suitable set of options based on the automatic clustering. For example, query exploration interface 114 shows options for replacing the word "red" from the original query. Similarly, query exploration interface 116 need not be limited to options being types of garments; for example, query exploration interface 116 may present other associated items that users may be interested in searching for when searching for shoes (e.g., "red fabric," "red glasses," "red notebook," or "red phone case").

Although FIG. 1 shows two query exploration interfaces, each including two options for structured exploration based on queries, the methods of the present disclosure may be used for any suitable number of query exploration interfaces and/or exploratory query options presented in each interface.

In general, as will be described in further detail below, each query exploration interface corresponds to a query cluster from historical query data that includes the search query 110 in addition to other historical queries. Accordingly, the options presented in each query exploration interface each correspond to one of the other historical queries in the query cluster. Queries may be clustered in any suitable manner. In a non-limiting example, queries may be clustered by representing each query as a vector representation (e.g., a semantic embedding assessed by a natural language model) and clustering the vector representations in any suitable fashion (e.g., k-means). Accordingly, each cluster may be associated with a plurality of historical queries. In some examples, each cluster may be associated with a cluster-representative vector, e.g., a cluster centroid vector determined based on the other vectors.

In some examples, the number of query exploration interfaces may be selected based on a number of clusters that match search query 110, based on any suitable matching function (e.g., based on threshold similarity of a vector representation of the query to a cluster-representative vector of the cluster). For example, the query exploration interfaces may include one query exploration interface for each query cluster that has a centroid with at least a threshold similarity to the search query 110. In some examples, the number of query exploration interfaces may be fixed. For example, there may be a small, fixed number of interfaces (e.g., 3 interfaces). Accordingly, the query clusters to be used by the query exploration interfaces may be selected in any suitable manner, e.g., by ranking the clusters based on similarity of the vector representation of query 110 to the cluster-representative vector of each cluster, and selecting the top fixed number of clusters.

In some examples, the number of exploratory queries may be a fixed number for all of the interfaces (e.g., two options in each interface). In other examples, the number of exploratory queries may be a variable number for each different interface. In some examples, the number of exploratory queries shown for an interface may be determined based on a number of candidate query terms in an associated query cluster that have at least a threshold similarity to the search query 110 (e.g., all candidates with at least the threshold similarity, and/or at most the top-ranked fixed number of candidates with at least the threshold similarity).

The variable query terms related to a cluster are derived from the search terms in the cluster. Accordingly, using any suitable representation of queries and/or clustering algorithm for partitioning queries into clusters, a given query cluster may include any suitable set of terms. The terms are not necessarily related in a way that can be pre-defined in terms of a specific computer-readable and/or natural language description (e.g., the terms do not necessarily correspond to specific entities and/or facets). Instead, each cluster represents an aspect of the query that is akin to an abstract "dimension" of possible variations on a search term that can be used for structured exploration of variations on the search term. As compared to pre-defined "facets," the aspects of a query represented by a cluster may not cleanly correspond to a particular English-language or other natural-language concept. For example as compared to a pre-defined facet for colors, a query cluster may represent an "appearance" aspect that includes different colors as well as different materials, surface patterns, etc. Different aspects of a query may enable structured exploration of the query (e.g., exploring related queries by modifying structure of the query, such as by adding, removing, and/or modifying query terms). The different aspects of the query may permit exploration similar to pre-defined facets. Accordingly, aspects of the query may be regarded as dynamic facets (e.g., facets that are dynamically derived based on the queries in the cluster, instead of being pre-defined). Furthermore, each different aspect of the query may be regarded as defining a different "dimension" of the query. Accordingly, queries may be related to other queries along one or more dimensions. For example, dimensions for the query shown in FIG. 1 may include "color," and "garment type." Furthermore, exploratory queries may be generated based on an initial query by adding a new query term related to a new dimension (e.g., adding a "price" dimension and adding a new query term such as "cheap" or "less than $50"), varying a query term related to an existing dimension (e.g., "red" instead of "blue"), and/or removing/replacing a dimension (e.g., removing the "blue" query term, and/or replacing "blue" with "less than $50".) The contents of the query cluster, and accordingly the relationship among different options for structured exploration based on that "dimension" of the query, e.g., exploring alternate queries that are varied with regard to that "dimension," are driven by data (e.g., by relevance of actual queries that replace a variable query term in different ways). Furthermore, as shown in FIG. 1, the different "dimensions" are orthogonal to each other in the sense that each of them focuses on replacing a different variable term from the original search query. Accordingly, the different query exploration interfaces provide the user with different alternative options to explore other queries that are related to the original search query with regard to different aspects of the original search query.

FIG. 1 is one non-limiting example of a computing system 100 configured for domain-agnostic query exploration. The techniques of this disclosure may be implemented using any suitable computing system including any suitable computing devices. Accordingly, FIG. 2 shows a method 200 for a search engine to provide domain-agnostic options for structured exploration based on a query (e.g., exploring alternative queries, for example based on expanding the query and/or modifying the query). Method 200 may be implemented by system 100 and/or by any other suitable computer system.

At 202, method 200 comprises clustering a corpus of historical queries into a plurality of query clusters. "Corpus" may be used herein to refer to any suitable collection of queries and/or associated documents (e.g., web search results), along with any suitable metadata (e.g., session information for one or more search sessions, by one or more distinct users, indicating co-occurrence of a plurality of historical queries in the session). A corpus of historical queries may be of any suitable size, e.g., thousands, millions, billions, or more. The corpus of queries may include actual historical queries (e.g., input by previous users of a search engine), queries supplied by human demonstrators who are instructed to supply exemplary queries, computer-generated queries (e.g., computer-generated paraphrases of historical queries). As an example, the corpus of queries may include computer-generated paraphrases so as to include similar and/or equivalent search terms, e.g., a corpus that includes a phrase such as "Portland jobs" may be augmented to further include similar phrases such as "jobs in Portland," or "Portland careers." The corpus of queries may be clustered in any suitable fashion, e.g., using k-means based on vector representations of each query in the corpus. As a result of the clustering, each query cluster of the plurality of clusters includes historical queries demonstrating a common query structure for that query cluster. For example, the queries may include queries having similar lexical structure, commonly-occurring entities, similar vector representations, and/or any other suitable similarities (e.g., similar user intent as indicated in a computer-readable query command representation, and/or similar user intent as assessed by a statistical model).

Furthermore, the common query structure of queries in the cluster includes an associated variable query term that occurs in a plurality of queries. As an example, as shown in FIG. 1, a cluster of queries related to "shoes" may have a variable query term such as "color," so that the cluster corresponds to query exploration options such as the different color options shown in query exploration interface 114. Accordingly, the queries in the cluster related to "shoes" may all have a specific query term related to shoes, along with each option having a different variable query term corresponding to the many different choices of color that may co-occur in different queries in the cluster.

At 204, method 200 comprises, for each query cluster of the plurality of query clusters, identifying a set of variable query terms in the historical queries. For example, the variable query terms for the cluster corresponding to query exploration interface 114 of FIG. 1 may include color terms like "blue" and "green," as well as optionally further related terms such as "plaid," "canvas," "leather," and the like. Similarly, the variable query terms for the cluster corresponding to query exploration interface 116 may include any suitable terms, e.g., "dresses," "purses," and/or any other terms that may occur in a cluster of related searches along with the initial search for "red shoes" (e.g., including, but not necessarily limited to terms for other types of garments, accessories, and/or any other item that a user may search for along with red shoes).

At 206, method 200 comprises receiving a new user query. Optionally, the method may further comprise returning an initial set of results to the new user query at this time (e.g., to populate a search results interface 120 as shown in FIG. 1). This initial population of search results may be performed using any suitable search engine methodology. Furthermore, as will be described below, the new user query may be processed with regard to the query clusters in order to provide query exploration options for the new user query. In some examples, the new user query is a natural language query including an ordered plurality of words. In some examples, the new user query is a computer-readable query command defined according to a computer-readable syntax (e.g., according to any of the non-limiting approaches described above with regard to search query 110 of FIG. 1).

At 208, method 200 comprises identifying a query structure of the new user query. For example, for a natural language query including an ordered plurality of words, the query structure may include a subsequence of the ordered plurality of words (e.g., any subset of the ordered plurality of words, optionally indicating gaps where words of the ordered plurality are omitted from the subset). As another example, for a computer-readable query command, the query structure may include a syntactic feature of the computer-readable command (e.g., a function name, a variable name, a plain-text string occurring as a parameter of the command, and/or any other suitable feature of computer-readable commands as described above).

As a non-limiting example of query-structure, with reference to FIG. 1, the query exploration interface 114 options 114A and 114B correspond to different ways of substituting in specific colors for a query adhering to a structure "<color> shoes." In the example, "<color>" represents the variable term for colors (and/or other properties of shoes that users may search for along with red shoes, such as different materials or patterns). The search query 110 specifies a specific term, "red" for the "<color>" variable. Similarly, the options in query exploration interface 116 correspond to a query structure such as "red<garment>" where "<garment>" represents a variable term for different garments (and/or other things users may search for along with shoes and other garments). The search query 110 specifies a specific term, "shoes," for the "<garment>" variable. Query structures may be represented in any suitable computer-readable format. For example, a query structure may be represented using any suitable syntax for indicating variables, placeholders, etc., such as the angle-bracket syntax shown above. As another non-limiting example, a query structure may be represented by syntax for a query command (e.g., including variables, placeholders, function names, literal values, and/or any other suitable features of a query command syntax). As another non-limiting example, a query structure may be represented by a vector encoding of a query. In some examples, a query structure may be represented by one or more constraints on vector-encoded queries (e.g., a constraint on a sub-vector with regard to one or more dimensions, a Euclidean norm with regard to one or more dimensions, and/or any other suitable measure of one or more dimensions of a vector-encoded query). For example, a query structure may be represented by a vector encoding of a representative query, along with a predicate function indicating a constraint on other vectors relative to the vector encoding of the representative query. Accordingly, matching a candidate query against the query structure may include assessing the predicate function with regard to the candidate query and the representative query. For example, the predicate function may be based on measuring a distance value, e.g., assessing whether the candidate query and the representative query have at most a predefined threshold vector distance and/or at most a predefined threshold cosine difference. More generally, the methods of the present disclosure may be implemented with regard to any suitable representation of query structure (e.g., any combination of syntax, vector encoding(s), predicate function(s), etc.). Although the examples herein are described with regard to query structure features including lexical features (e.g., natural-language words, computer-readable text, and/or variables, placeholders, etc.), queries and/or query structures may be represented with any suitable features. For example, queries and/or query structures may include audio features (e.g., pitch, volume, etc.), semantic features (e.g., sentiment analysis, intent analysis, entity encodings, etc.), context features (e.g., time of day of query, user demographic features, user-specific configuration features), and/or any other suitable features related to queries. As a non-limiting example, instead of and/or in addition to clustering queries and deriving query structures based on lexical content, one or more of the queries, query clusters, and/or query structures may be based on a feature vector representation of queries. For example, the feature vector representation may be based on a semantic feature derived from speech audio features and/or utterance content (e.g., sentiment analysis of user mood based on pitch, and/or analysis of utterance based on natural-language content occurring in the utterance).

At 210, method 200 comprises selecting a specific query cluster matching the query structure of the new user query. For example, the specific query cluster may be selected based on any suitable assessment of similarity of the new user structure to one or more queries in each of a plurality of candidate query clusters. For example, the specific query cluster may be selected based on a measure of similarity between a vector representation of the new user query and a cluster-representative vector of each candidate query cluster, e.g., a centroid vector of each candidate query cluster.

At 212, method 200 comprises identifying the variable query term in the query structure of the new user query, for example with regard to the selected specific query cluster. The variable query term may be identified in any suitable fashion, for example, based on identifying commonly-occurring fixed portions of the new user query and one or more queries in the cluster, and deriving the variable query term from portions of queries that lie outside of the commonly-occurring fixed portions. As an example, for a new user query "red shoes" and a selected query cluster including other queries about shoes, a commonly-occurring fixed portion in each query refers to "shoes," and the remainder of each query represents the variable query term (e.g., with different variable query terms for different colors such as "blue" or "green," as well as different patterns, materials, etc.).

Returning to FIG. 2, at 214, method 200 comprises providing a query exploration interface offering a plurality of different user-selectable options for structured exploration based on the new user query, each of the plurality of different user-selectable options corresponding to a particular variable query term in the identified set of variable query terms for the specific query cluster identified as matching the query structure of the new user query.

Portions of method 200 may be performed repeatedly, for example, to select more than one cluster and to provide more than one query exploration interface based on the selected clusters. For example, 208, 210, and 212 may be repeated with regard to a plurality of different query structures of the new user query, corresponding to common query structures of a plurality of different query clusters. Accordingly, 214 may be performed with regard to each different query cluster, in order to provide a different query exploration interface for each cluster. For example, as shown in FIGS. 1 and 3A-3C, two query exploration interfaces are provided, corresponding to two different query clusters. Accordingly, for example, method 200 may further comprise selecting a second specific query cluster, having a second common query structure matching a second query structure of the new user query, and providing a second query exploration interface offering a second plurality of different user-selectable options for structured exploration based on the new user query based on the second specific query cluster.

More concretely, to present a first query exploration interface and a second query exploration interface, steps of method 200 may be performed in order to identify a first query structure of the new user query, select a corresponding first specific query cluster matching the first query structure of the new user query, and identify a first variable query term corresponding to the first query structure. Steps of method 200 may be repeated, or performed in parallel, to identify a second query structure of the new user query, select a corresponding second specific query cluster matching the second query structure of the new user query, and identify a second variable query term corresponding to the second query structure. The method may further comprise providing a search interface including a first query exploration interface and a second query exploration interface. Accordingly, each of the first query exploration interface and the second query exploration interface is configured to offer a different plurality of different user-selectable options for structured exploration of the new user query, each of the plurality of different user-selectable options corresponding to a particular variable query term in the identified set of variable query terms for the specific query cluster identified as matching the query structure of the new user query. Namely, the first query exploration interface is configured to offer a plurality of options derived from the first query cluster, and the second query exploration interface is configured to offer a plurality of options derived from the second query cluster.

In some examples, a first user-selectable option of the first query exploration interface is selectable to cause the search interface to provide results for a first exploratory query based on the new user query, but with the variable query term replaced based on the first user-selectable option. For example, FIG. 3A shows an example search GUI 112 with additional detail as compared to FIG. 1. For example, query exploration interfaces 114 and 116 have additional options (e.g., new options 114C, 116C, and 116D not shown in FIG. 1). As indicated at 122, a user may select option 114A, "blue shoes," indicating an exploratory query where the variable query term is "blue" as indicated by the option, instead of "red" from the original query.

Figure 3B:
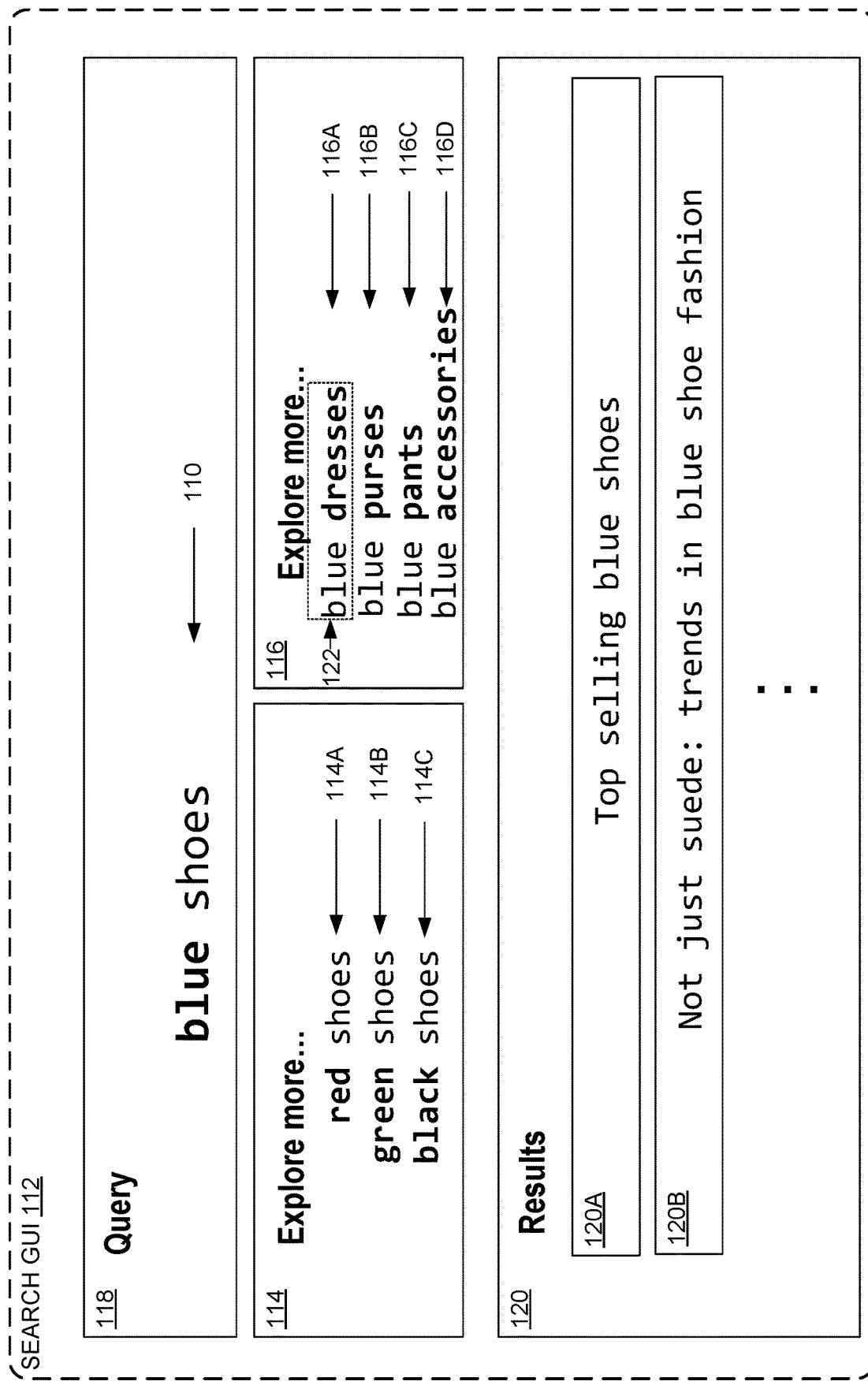

FIG. 3B shows the example search GUI 112 after the user selects the option for "blue shoes." As shown, the search query 110 is updated to show "blue shoes" instead of "red shoes." Accordingly, the search engine may perform a new search (e.g., using any suitable search engine methodology) based on the new query. As an example, the search engine may perform the new search for "blue shoes" as though the user had submitted the "blue shoes" query 110 via the query input box 118. Accordingly, the results in result interface 120 are updated to show new results based on the new query. Furthermore, query exploration interface 114 and query exploration interface 116 are each updated to reflect new domain-agnostic query exploration options based on the new query. For example, query exploration interface 114 is updated to show different colors other than blue (and now including the original color from the previous query, "red"). Furthermore, query exploration interface 116 is updated to show different choices of "blue" garments instead of different "red" garments. As indicated at 122, the user may select a further option 116A at this point, to further explore the query based on the further option. Accordingly, as shown in FIG. 3B, a second user-selectable option of the second query exploration interface is further selectable to cause the search interface to provide results for a second, further exploratory query based on the new user query with the variable query term replaced based on the second user-selectable option.

Figure 3C:
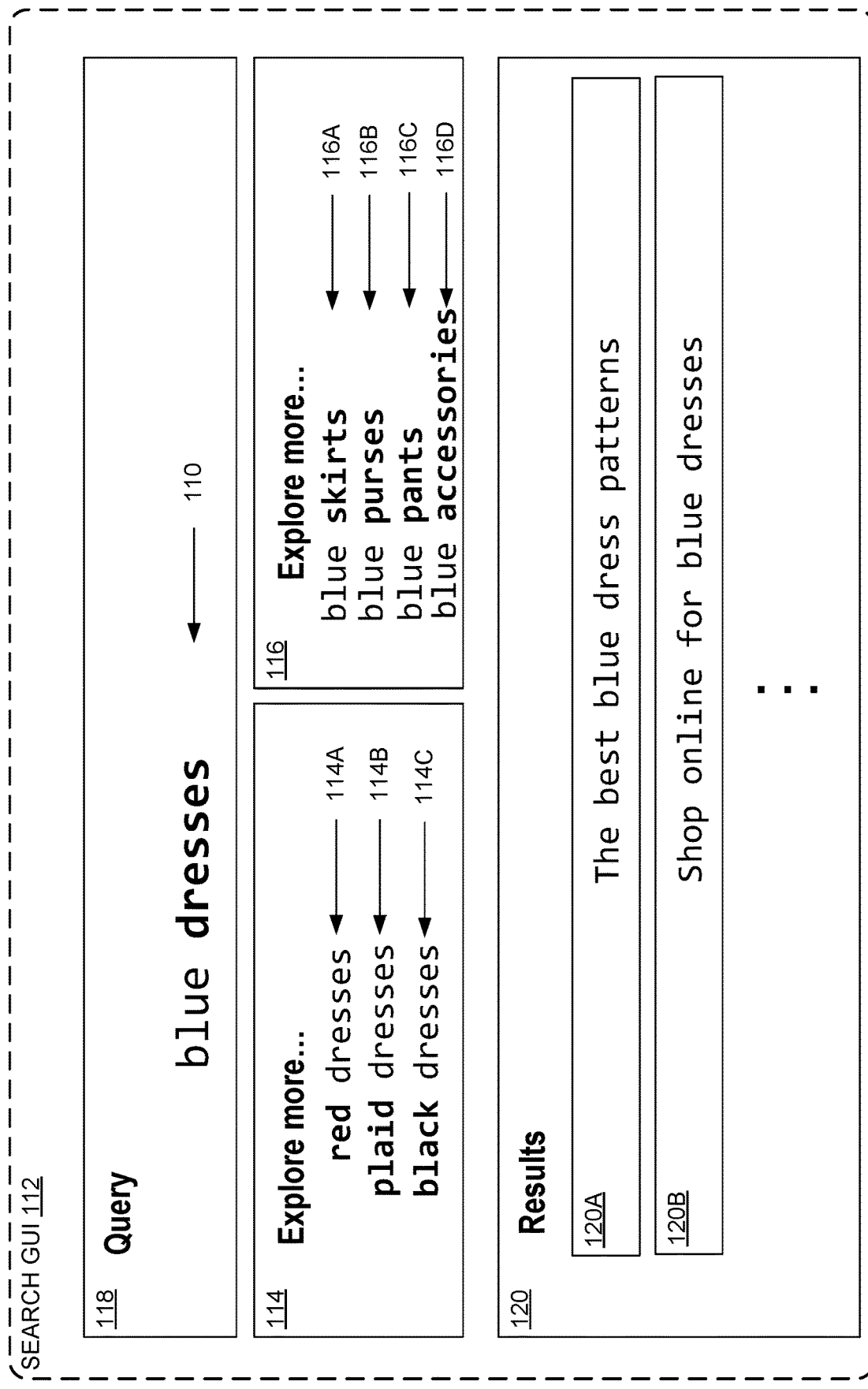

FIG. 3C shows the example search GUI 112 after the user selects the option for "blue dresses" (based on the exploratory query for "blue shoes" in FIG. 3B). Accordingly, search query 110 and the results in results interface 120 are updated to reflect the exploratory query. Furthermore, query exploration interface 114 and query exploration interface 116 are updated to show exploration options with regard to the "blue dresses" search query 110. As shown, the exploration options are not exactly the same options that were presented with regard to "blue shoes." Instead, the exploration options reflect other searches in clusters that include the "blue dresses" query, which may have different variable search terms as compared to the clusters that include the "blue shoes" query. The variable search terms are derived from the exemplary search terms in the corpus, partitioned into clusters. Accordingly, the different options are based on search terms of queries that appear together in one or more clusters. The variable search terms are not dependent on human curation. Accordingly, the exploration options may include relevant options that occur in actual searches, irrespective of any human curator explicitly deeming such options to be appropriate.

In some examples, as shown in FIG. 3A, the new user query includes a query structure corresponding to one of the query exploration interfaces. Accordingly, a query having a given query structure may specify a specific query term for the variable query term, with regard to the query structure shared with a particular query exploration interface. For example, search query 110 includes a query structure defined by the common presence of the fixed term "shoes" and the variable term for colors, e.g., "<color> shoes" as described above.

Accordingly, as shown in FIG. 3A, the plurality of different user-selectable options in the query exploration interface 114 are associated with alternative queries, each alternative query based on replacing the specific query term (e.g., "red") with a different alternative query term (e.g., "blue" as in option 114A). Similarly, the plurality of different user-selectable options in the query exploration interface 116 are associated with alternative queries, each alternative query based on replacing the specific query term (e.g., "shoes") with a different alternative query term (e.g., "dresses" as in option 116A). The different alternative query terms may be selected in any suitable fashion. As non-limiting examples, the different alternative query terms may be selected based on similarity to the originally specified query term, and/or based on frequency of occurrence of different alternative query terms within the query cluster.

Figure 3D:
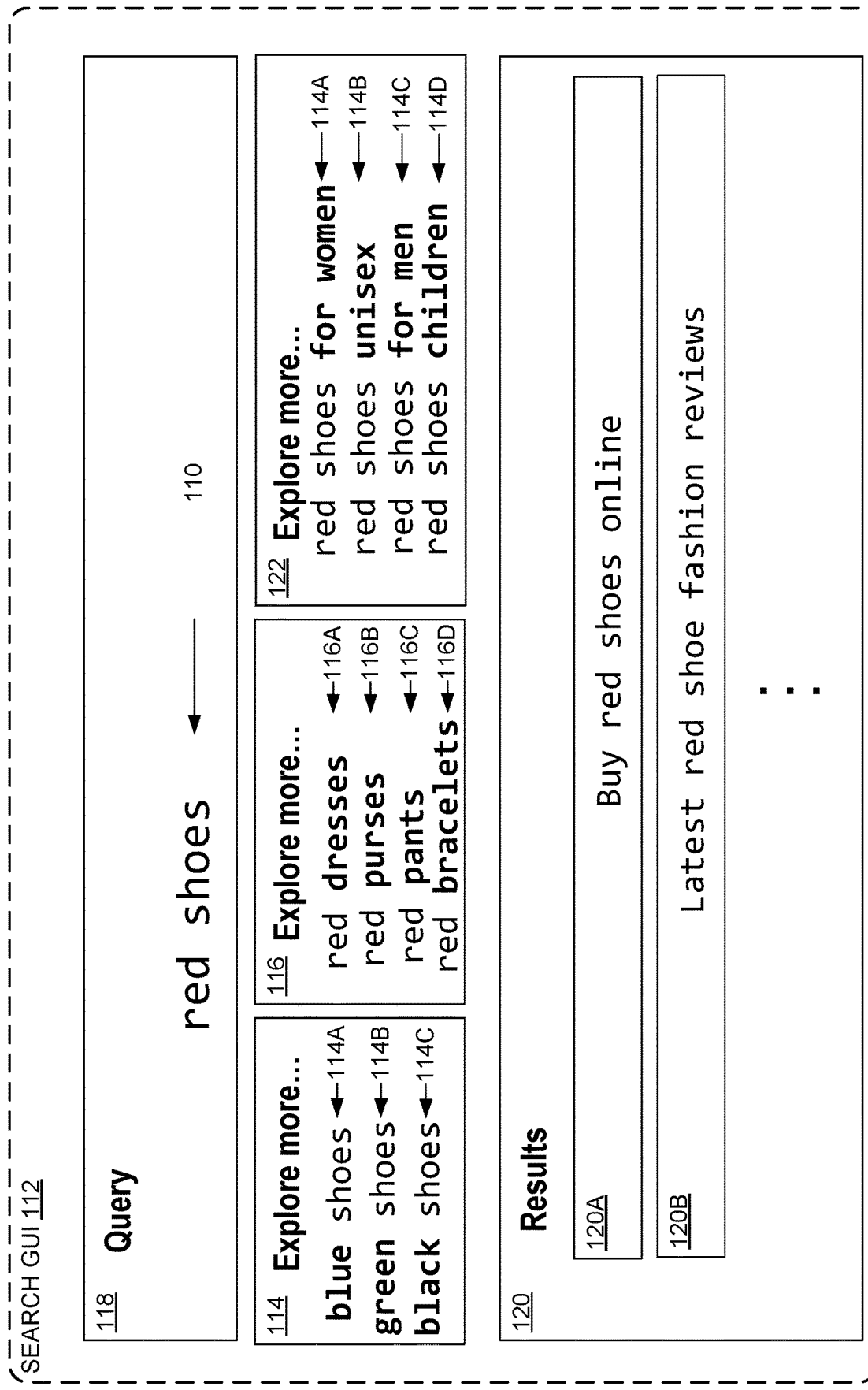

Although FIGS. 3A-3C show only two different query exploration interfaces, a search GUI 112 may include any suitable number of query exploration interfaces. Accordingly, FIG. 3D shows another non-limiting example of a search interface including three different query exploration interfaces, namely query exploration interface 114, query exploration interface 116, and query exploration interface 122.

In some examples, as described above, the new user query specifies a specific query term for the variable query term in a query structure shared with a particular query exploration interface. However, in other examples, the new user query may include a query structure for which the new user query does not specify any particular query term (e.g., the new user query may include a blank, placeholder, or otherwise omit any specification with regard to that variable query term). As an example, as shown in FIG. 3D, query exploration interface 122 includes refined options based on an initial search query 112 for "red shoes." The initial search query 110 does not include any specification of a "wearer" of the shoes (e.g., such as "women," "men," "unisex," or "children"). However, the initial search query 110 may nevertheless be similar to other queries in a cluster that include such terms. In other words, the initial search query 110 for "red shoes" may be regarded as matching a query structure that has a variable query term that is left unspecified in the initial search query 110, e.g., a structure like "red shoes<wearer>" where "<wearer>" is a variable representing the type of person the shoes are designed for. As such, the variable query term may be related to queries that may or may not include any specific term for the variable query term. Accordingly, in some examples, the new user query matches the query structure while leaving the variable query term unspecified, as with "red shoes" with regard to the query cluster corresponding to query exploration interface 122. Accordingly, the plurality of different user-selectable options in the query exploration interface 122 are associated with refined queries, where each refined query specifies a different suggested query term for the variable query term.

As described above and as shown in FIG. 3D, search GUI 112 may include three or more query exploration interfaces. Accordingly, method 200 may further comprise selecting a third specific query cluster that has a third common query structure matching a third query structure of the new user query, and providing a third query exploration interface that offers a third plurality of different user-selectable options for structured exploration based on the new user query based on the third specific query cluster. For example, as shown in FIG. 3D, the common query structure, the second common query structure, and the third common query structure may each correspond to a topic associated with the new user query. Accordingly, different user-selectable options of each exploration interface are associated with different queries related to a corresponding topic.

Although the exemplary search interfaces described above and shown in the figures each include two or more query exploration interfaces, in some examples, there may be only one query exploration interface, or there may be zero query exploration interfaces. For example, if the new user query only has at least threshold similarity with one of the query clusters, there may be only one query exploration interface corresponding to that query cluster. If the new user query is not sufficiently similar to any of the query clusters, there may be no query exploration interface. Accordingly, method 200 may include determining, based on similarity of a new user query to the one or more query clusters, whether or not to present any query exploration interface for the query.

More generally, method 200 may include determining, based on similarity of a new user query to the one or more query clusters, how many query exploration interfaces to present. In some examples, there are a plurality of candidate query clusters, each candidate query cluster demonstrating a candidate query structure matching the query structure of the new user query. Accordingly, method 200 may further comprise assessing a correspondence between the new user query and historical queries of each candidate query cluster, and presenting a query exploration interface for a limited selection of specific query clusters having the highest-ranked correspondences.

For example, although FIG. 3A shows query exploration interfaces for different colors of shoes and for different red garments, the query "red shoes" may have also matched a different query cluster corresponding to historical queries about other, less closely-corresponding red objects (e.g., a query cluster including "red bicycle" and "red helmet" along with "red shoes"). However, search GUI 112 may be configured to present interfaces only for the top-two ranked query clusters with regard to correspondence to search query 110, and/or to present query exploration interfaces only for query clusters having at least a threshold correspondence to the search query 110.

Although FIGS. 1 and 3A-3D show exemplary queries related to shoes and garments, the methods of the present disclosure may be applied to any query, with regard to any topic. As described above, query exploration options for a query are derived from other exemplary queries in a cluster associated with the query. Accordingly, query exploration may be performed for any query and/or topic, based on the clustering. Because new queries may be used to update the clusters, the clusters for query exploration and associated options for query exploration may be updated based on data (e.g., continually updated as users conduct new searches using a search engine). Accordingly, query exploration options may be obtained for any query and/or topic without any need for human curators to author and/or assess query exploration options for the topic. Accordingly, the query exploration options may be obtained based on data, irrespective of human assessment of relevance, suitability, etc. As non-limiting examples, the methods of the present disclosure may be applied to a query about nutritional contents of a food (e.g., vitamin C in papaya) in order to provide query exploration interfaces related to nutritional contents of other foods (e.g., vitamin C in oranges), other nutritional contents of the same food (e.g., vitamin K in papaya), and/or refined queries (e.g., "vitamin C in papaya per serving," or "vitamin C in papaya whole fruit"). As further non-limiting examples, the methods of the present disclosure may be used to explore relationships between different queries based on common characteristics of entities mentioned in queries (e.g., suggesting "Jeff Bezos net worth" based on "Bill Gates net worth", and/or suggesting "Bill Gates companies founded" based on "Bill Gates net worth"). As a further non-limiting example, a query may be associated with multiple clusters having similar types of content (e.g., having a similar variable query term). Accordingly, suggested query explorations for the query may be drawn from the multiple, similar clusters. For example, a query such as "math jobs in Portland" may be 1) associated with suggestions drawn from a first cluster including "applied math jobs in Portland," "programming jobs in Portland," and "financial jobs in Portland," and also 2) associated with suggestions drawn from a second cluster including "math teacher jobs in Portland," "math tutor jobs in Portland," and "science teacher jobs in Portland," and also 3) associated with suggestions drawn from a third cluster including "math jobs in Seattle," and "math jobs in Austin," and also 4) associated with suggestions drawn from a fourth cluster including "math jobs in Eugene" and "math jobs in Salem." As an example, the first cluster may correspond roughly to "other applied math" jobs, the second cluster may correspond roughly to "other math teacher" jobs, the third cluster may correspond roughly to "jobs in other cities with similar demographic features," and the fourth cluster may correspond roughly to "jobs in other cities that are geographically nearby." However, the techniques of the present disclosure are not limited to clusters that correspond to specific natural language concepts such as "jobs in other cities." Instead, the suggestions drawn from a cluster may be based on any suitable relationships among historical queries in the cluster and/or common structure of the historical queries.

Accordingly, query clusters may be determined in any suitable manner by performing one or more levels of clustering (e.g., iteratively clustering the initial corpus at a first level, and optionally further partitioning each cluster into sub-clusters at subsequent levels). Furthermore, the query structure, variable query term, and specific candidate query terms for replacing the variable query term in the query interface may be derived from the query clusters in any suitable manner. The clustering process may be based on similar query intent (e.g., based on a natural language model and/or based on syntactic features of computer-readable query commands), similar natural language content, co-occurrence of entities in queries, and/or any other suitable features of queries.

In some examples, the clustering process may include clustering based on any suitable measure of query similarity, e.g., query embeddings (e.g., vector representations), graph-based methods (e.g., random walk with restart in a graph of the queries), clustering based on co-occurrence of queries in user search sessions, and/or co-occurrence of web document results for different queries. The clustering may be based on any suitable clustering algorithm implemented with regard to any suitable measure of similarity, e.g., k-means.

In some examples, a common query structure for a query cluster corresponds to a query topic common to historical queries in the query cluster, wherein each historical query in the query cluster corresponds to a combination of the query topic and a corresponding specific query term in place of the variable query term. For example, for a cluster including a plurality of queries about shoes of different colors, the query topic may be related to "shoes" and each historical query in the query cluster corresponds to a combination of the word "shoes" (e.g., or a synonym or related word, such as "heels") with a corresponding specific query term in place of a variable query term for "<color>" of the shoes. Accordingly, the specific queries in the cluster may include queries like "blue shoes," "red shoes," "plaid shoes," and the like. In some examples, the common query structure may be identified based on a frequency of co-occurring phrases in queries in a cluster, e.g., so that the query structure is indicated by a most frequent phrase (such as "shoes" in the above example). Accordingly, the common query structure for a query cluster may be determined based on identifying a most popular phrase occurring in a plurality of queries in the query cluster.

In some examples, determining the common query structure for a query cluster may be based on identifying one or more contextually-related entities that are mentioned in the historical queries of the query cluster. For example, queries may be partitioned into a cluster based on each mentioning the same entity. Alternately or additionally, queries may be partitioned into a cluster based on each relating to similar aspects of related entities. For example, a plurality of queries about athlete salaries (e.g., different specific queries mentioning different specific athlete names and salaries such as "Aaron Rodgers salary" and "Russell Wilson salary") may be partitioned into a cluster based on mentioning similar entities (e.g., "Aaron Rodgers" and "Russell Wilson" are both football players). As used herein, "entity" may refer to people, places, animals, objects, products, concepts, and/or any other suitable natural-language feature (e.g., a noun). For example, entities being specific humans and/or cities are non-limiting examples. More broadly, entities may include concepts such as colors (e.g., by treating words like "red" and "blue" as entities) or type of objects (e.g., garments as shown in the examples above). Accordingly, clustering based on contextually-related entities may be applied broadly to any type of query, if the query mentions the same entities as other queries in a corpus. For example, "red shoes" and "blue sandals" may be clustered together based on having the contextually related entities "red" and "blue," or alternately or additionally, may be clustered based on a different contextual relationship between entities "shoes" and "sandals." In some examples, a query cluster may be broken into one or more sub-clusters, depending on the initial number of contextually-related entities corresponding to the cluster. Accordingly, in some examples, clustering the corpus of historical queries into a plurality of query clusters includes, responsive to an initial query cluster having more than a threshold number of queries, multi-level clustering the initial query cluster into a plurality of sub-clusters. For example, if there are more than a threshold number of contextually-related entities corresponding to the cluster, the queries in the cluster may be further partitioned into smaller sub-clusters (e.g., by iteratively applying further levels of clustering using any of the clustering techniques described herein), to obtain sub-clusters that correspond to fewer than the threshold number of entities. In some examples, the entities corresponding to a cluster may be assessed to check whether the set of entities does form a contextual group (e.g., based on satisfying a measure of similarity between entities). Accordingly, if a cluster is assessed to not form a contextual group (e.g., because the cluster has more than one, contextually disparate groups), the cluster may be further portioned into sub-clusters.

Partitioning into sub-clusters may result in smaller sub-clusters which may have more closely related queries. Accordingly, the smaller sub-clusters may better reveal salient aspects of relationships between queries that are suitable for query exploration. For example, a cluster that includes "red shoes," "red cars," "red trucks," and "red sandals," may have a common structure related to the fixed term "red" along with a variable term for an object (e.g., "cars" or "sandals."). However, the cluster may be less useful than two distinct sub-clusters would be, for example, a first cluster including "red shoes" and "red sandals" would pertain to a possibly more useful common structure related to the fixed term "red" along with a variable term for a type of footwear. Similarly, a second cluster including "red cars" and "red trucks" would pertain to a possibly more useful common structure related to the fixed term "red" along with a variable term for a type of vehicle. Although the fixed term "red" occurs in both sub-clusters, a user may typically be more interested in finding footwear-related results based on a query like "red shoes" and uninterested in vehicle-related results. Accordingly, breaking the initial cluster into sub-clusters may result in possibly more relevant query exploration suggestions. Although the example described above is with regard to an initial cluster including four queries, sub-clustering may be used to obtain sub-clusters of any suitable size (e.g., sub-clusters with tens, hundreds, or thousands of queries). In some examples, determining the common query structure for a query cluster may be based on multi-level clustering a plurality of historical queries of the query cluster into sub-clusters. For example, the sub-clusters may be partitioned based on a contextual relationship between entities mentioned in the plurality of historical queries of the query cluster. Accordingly, the common query structure may be determined based on the queries in the sub-cluster, thereby reflecting common features of related queries in the sub-cluster (e.g., common features of contextually-related queries that mention one or more contextually-related entities).

The contextual relationship between entities may be determined in any suitable fashion. For example, the contextual relationship may be assessed based on comparing semantic vector encodings for entities mentioned in the plurality of historical queries of the query cluster. As another example, the contextual relationship between entities is determined based on a comparison among search context vectors derived from web search result listings associated with historical queries of the query cluster. For example, a search context vector for a query may be a vector representation of search result titles, summaries, and/or full documents resulting from a query. The search context vector may be determined based on retrieving the results with the search engine and encoding the retrieved results in any suitable fashion, for example by operating a natural language model. The search context vectors for entities may be compared in any suitable fashion, e.g., using cosine similarity or using a machine-learning model configured to assess vector similarity.

In some examples, the contextual relationship between entities is determined based on entity co-occurrence vector data indicating whether each entity is mentioned by each document of a corpus of documents, wherein the contextual relationship between entities is determined based on comparing the entity co-occurrence vector data for a plurality of entities mentioned in historical queries in the query cluster. For example, relevant entities may co-occur in common contexts in published documents (e.g., documents that occur in search results, documents accessible to web-crawler and/or data-mining services associated with a search engine). As an example, the corpus of documents may include a plurality of web tables, each web table associated with an index of entities. Entities of interest may be identified in a web table based on one or more heuristics (e.g., based on matching name, based on matching entity attributes specified in one or more columns of a web table). Accordingly, entity co-occurrence vector data may be derived from the web tables based on an inverted index indicating, for each entity, a listing of each web table with an associated index including the entity. In other words, while each web table has an index indicating which entities occur in that table, each entity may be associated with a derived inverted index that indicates which tables include that entity. Accordingly, entities which occur in similar contexts (e.g., similar web tables) may have similar inverted indices. In some examples, the entity co-occurrence vector data for a first entity may be a sparse vector indicating, for each other entity, a count of the number of tables in which the first entity and the other entity co-occur. In other words, the co-occurrence vector may indicate a frequency distribution of pairwise co-occurrence of the first entity and each other entity. Co-occurrence vectors for entities may be compared to assess similarity in any suitable fashion, e.g., based on a cosine similarity measure.

In some examples, the corpus of web tables may include 600 million or more web tables. However, with 600 million or more web tables, it may not be desirable to assess pairwise co-occurrence for every possible pair of entities (e.g., for each pair of entities occurring in a corpus of 1 billion or more queries). Instead, entity similarity may be computed selectively for a limited set of pairs of entities that are likely to co-occur, based on computing a hash representation of the web document contents representing the entities. For example, the MinHash algorithm may be used to compute a hash vector with regard to each table and each entity in the table, and entities may be treated as dissimilar unless they correspond to a collision of hash vector values in the hashed value space. Accordingly, entities that do correspond to such a collision may be assessed for similarity with regard to the (potentially large number of) web tables, while avoiding the computational burden of performing the full similarity assessment for entities that do not correspond to a collision in the hashed value space. Accordingly, entity co-occurrence vector data may be assessed selectively for different pairs of entities, including selectively assessing the entity co-occurrence vector data solely with regard to pairs of entities satisfying a hash collision property.

The techniques described above may be combined in any suitable fashion, for example, multi-level clustering may include initial clustering of the corpus based on obtaining sets of queries corresponding to at most a threshold number of entities in each set, followed by second-level clustering based on entity co-occurrence vector data. The clustering approaches described herein may be applied repeatedly to partition clusters at any number of levels. Furthermore, a given historical query may be included in more than one cluster. Similarly, a given new user query may be assessed to be similar to more than one cluster. Accordingly, a search engine may be configured to provide any suitable number of query exploration interfaces, based on clusters associated with the given user query.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 4:
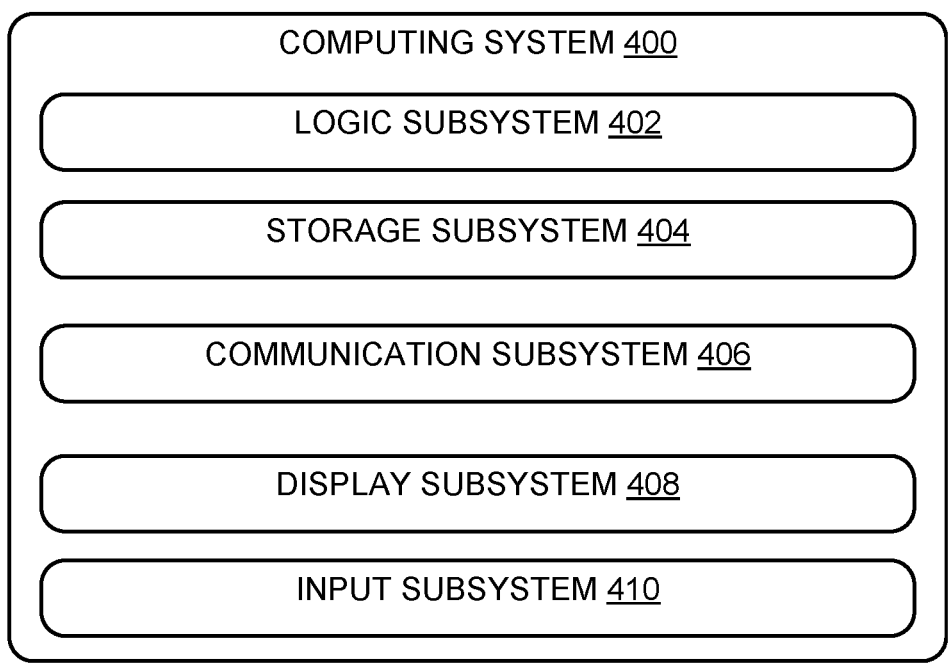
FIG. 4 shows an exemplary computing system.

FIG. 4 schematically shows a simplified representation of a computing system 400 configured to provide any to all of the compute functionality described herein. Computing system 400 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 400 includes a logic subsystem 402 and a storage subsystem 404. Computing system 400 may optionally include a display subsystem 408, input subsystem 410, communication subsystem 406, and/or other subsystems not shown in FIG. 4. For example, one or more components of computing system 100 (e.g., search engine server system 102) may be embodied as computing system 400.

Logic subsystem 402 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 404 includes one or more physical devices configured to temporarily and/or permanently hold computer information such as data and instructions executable by the logic subsystem. When the storage subsystem includes two or more devices, the devices may be collocated and/or remotely located. Storage subsystem 404 may include volatile, nonvolatile, dynamic, static, read/write, read-only, random-access, sequential-access, location-addressable, file-addressable, and/or content-addressable devices. Storage subsystem 404 may include removable and/or built-in devices. When the logic subsystem executes instructions, the state of storage subsystem 404 may be transformed—e.g., to hold different data.

Aspects of logic subsystem 402 and storage subsystem 404 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, language models may be used to translate a query received from a user in the form of a natural language utterance (e.g., text or speech sounds) into a computer-readable representation of a query, e.g., a computer-readable query command. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

When included, display subsystem 408 may be used to present a visual representation of data held by storage subsystem 404. This visual representation may take the form of a graphical user interface (GUI). Display subsystem 408 may include one or more display devices utilizing virtually any type of technology. In some implementations, display subsystem may include one or more virtual-, augmented-, or mixed reality displays.

When included, input subsystem 408 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 406 may be configured to communicatively couple computing system 400 with one or more other computing devices. Communication subsystem 406 may include wired and/or wireless communication devices compatible with one or more different communication protocols. The communication subsystem may be configured for communication via personal-, local- and/or wide-area networks.

In an example, a method for a search engine to provide domain-agnostic options for structured exploration based on a query comprises clustering a corpus of historical queries into a plurality of query clusters, each query cluster of the plurality being clustered to include historical queries demonstrating a common query structure for that query cluster, and each query structure including a variable query term. In this or any other example, the method further comprises, for each query cluster of the plurality, identifying a set of variable query terms in the historical queries. In this or any other example, the method further comprises receiving a new user query. In this or any other example, the method further comprises identifying a query structure of the new user query. In this or any other example, the method further comprises selecting a specific query cluster matching the query structure of the new user query. In this or any other example, the method further comprises identifying the new variable query term in the query structure of the new user query. In this or any other example, the method further comprises providing a query exploration interface offering a plurality of different user-selectable options for structured exploration based on the new user query, each of the plurality of different user-selectable options corresponding to a particular variable query term in the identified set of variable query terms for the specific query cluster identified as matching the query structure of the new user query. In this or any other example, the common query structure for a query cluster corresponds to a query topic common to historical queries in the query cluster, wherein each historical query in the query cluster corresponds to a combination of the query topic and a corresponding specific query term in place of the new variable query term. In this or any other example, the specific query cluster is one of a plurality of candidate query clusters, each candidate query cluster demonstrating a candidate query structure matching the query structure of the new user query, the method further comprising assessing a correspondence between the new user query and historical queries of each candidate query cluster, and the specific query cluster having a highest correspondence. In this or any other example, the method further comprises selecting a second specific query cluster, having a second common query structure matching a second query structure of the new user query, and providing a second query exploration interface offering a second plurality of different user-selectable options for structured exploration based on the new user query based on the second specific query cluster. In this or any other example, the method further comprises selecting a third specific query cluster, having a third common query structure matching a third query structure of the new user query, and providing a third query exploration interface offering a third plurality of different user-selectable options for structured exploration based on the new user query based on the third specific query cluster, wherein the common query structure, the second common query structure, and the third common query structure each correspond to a topic associated with the new user query, and different user-selectable options of each exploration interface are associated with different queries related to a corresponding topic. In this or any other example, the new user query is a natural language query including an ordered plurality of words, and the query structure includes a subsequence of the ordered plurality of words. In this or any other example, the new user query is a computer-readable query command and the query structure includes a syntactic feature of the computer-readable query command. In this or any other example, the new user query matches the query structure while leaving the new variable query term unspecified, and wherein the plurality of different user-selectable options in the query exploration interface are associated with refined queries, each refined query based on specifying a different suggested query term for the new variable query term. In this or any other example, the new user query includes the query structure and specifies a specific query term for the new variable query term, and wherein the plurality of different user-selectable options in the query exploration interface are associated with alternative queries, each alternative query based on replacing the specific query term with a different alternative query term. In this or any other example, the method further comprises determining the common query structure for a query cluster based on identifying a most popular phrase occurring in a plurality of queries in the query cluster. In this or any other example, the method further comprises determining the common query structure for a query cluster based on identifying a plurality of contextually-related entities mentioned in historical queries of the query cluster. In this or any other example, clustering the corpus of historical queries into a plurality of query clusters includes, responsive to an initial query cluster having more than a threshold number of queries, multi-level clustering the initial query cluster into a plurality of sub-clusters. In this or any other example, the method further comprises determining the common query structure for a query cluster based on multi-level clustering a plurality of historical queries of the query cluster into sub-clusters based on a contextual relationship between entities mentioned in the plurality of historical queries of the query cluster. In this or any other example, the contextual relationship between entities is determined based on comparing semantic vector encodings for entities mentioned in the plurality of historical queries of the query cluster. In this or any other example, the contextual relationship between entities is determined based on a comparison among search context vectors derived from web search result listings associated with historical queries of the query cluster. In this or any other example, the method further comprises assessing entity co-occurrence vector data indicating whether each entity is mentioned by each document of a corpus of documents, wherein the contextual relationship between entities is determined based on comparing the entity co-occurrence vector data for a plurality of entities mentioned in historical queries in the query cluster. In this or any other example, the corpus of documents includes a plurality of web tables, each web table associated with an index of entities, and the entity co-occurrence vector data is based on an inverted index indicating, for each entity, a listing of each web table with an associated index including the entity. In this or any other example, the entity co-occurrence vector data is assessed selectively for different pairs of entities, including selectively assessing the entity co-occurrence vector data solely with regard to pairs of entities satisfying a hash collision property.

In an example, a computing system comprises a logic subsystem, a communication subsystem, and a storage device holding instructions executable by the logic device. In this or any other example, the instructions are executable to cluster a corpus of historical queries into a plurality of query clusters, each query cluster of the plurality being clustered to include historical queries demonstrating a common query structure for that query cluster, and each query structure including a variable query term. In this or any other example, the instructions are executable, for each query cluster of the plurality: to identify a set of variable query terms in the historical queries; to receive a new user query, from a user device via the communication subsystem; to identify a query structure of the new user query; to select a specific query cluster matching the query structure of the new user query; to identify a new variable query term in the query structure of the new user query; and to provide, to the user device via the communication subsystem, a query exploration interface offering a plurality of different user-selectable options for structured exploration based on the new user query, each of the plurality of different user-selectable options corresponding to a particular variable query term in the identified set of variable query terms for the specific query cluster identified as matching the query structure of the new user query.

In an example, a method for a search engine to provide domain-agnostic options for structured exploration based on a query comprises clustering a corpus of historical queries into a plurality of query clusters, each query cluster of the plurality being clustered to include historical queries demonstrating a common query structure for that query cluster, and each query structure including a variable query term. In this or any other example, the method further comprises, for each query cluster of the plurality, identifying a set of variable query terms in the historical queries. In this or any other example, the method further comprises receiving a new user query. In this or any other example, the method further comprises identifying a first query structure of the new user query and a second, different query structure of the new user query. In this or any other example, the method further comprises selecting a first query cluster matching the first query structure of the new user query, and selecting a second query cluster matching the second query structure of the new user query. In this or any other example, the method further comprises identifying a first variable query term corresponding to the first query structure, and identifying a second variable query term corresponding to the second query structure. In this or any other example, the method further comprises providing a search interface including a first plurality of different user-selectable options for replacing the first variable query term, and a second plurality of different user-selectable options for replacing the second variable query term. In this or any other example, a first user-selectable option of the search interface is selectable to cause the search interface to provide results for a first exploratory query based on the new user query with the first variable query term replaced based on the first user-selectable option. In this or any other example, a second user-selectable option of the search interface is further selectable to cause the search interface to provide results for a second, further exploratory query based on the new user query with the second variable query term replaced based on the second user-selectable option.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for a search engine to provide domain-agnostic options for structured exploration based on a query, comprising:
    clustering a corpus of historical queries into a plurality of query clusters, each query cluster of the plurality being clustered to include historical queries demonstrating a common query structure for that query cluster, and each query structure including a variable query term;
    for each query cluster of the plurality, identifying a set of variable query terms in the historical queries;
    receiving a new user query;
    identifying a query structure of the new user query;
    selecting a specific query cluster matching the query structure of the new user query;
    identifying the new variable query term in the query structure of the new user query; and
    providing a query exploration interface offering a plurality of different user-selectable options for structured exploration based on the new user query, each of the plurality of different user-selectable options corresponding to a particular variable query term in the identified set of variable query terms for the specific query cluster identified as matching the query structure of the new user query.

2. The method of claim 1, wherein the common query structure for a query cluster corresponds to a query topic common to historical queries in the query cluster, wherein each historical query in the query cluster corresponds to a combination of the query topic and a corresponding specific query term in place of the new variable query term.

3. The method of claim 1, wherein the specific query cluster is one of a plurality of candidate query clusters, each candidate query cluster demonstrating a candidate query structure matching the query structure of the new user query, the method further comprising assessing a correspondence between the new user query and historical queries of each candidate query cluster, and the specific query cluster having a highest correspondence.

4. The method of claim 1, further comprising selecting a second specific query cluster, having a second common query structure matching a second query structure of the new user query, and providing a second query exploration interface offering a second plurality of different user-selectable options for structured exploration based on the new user query based on the second specific query cluster.

5. The method of claim 4, further comprising selecting a third specific query cluster, having a third common query structure matching a third query structure of the new user query, and providing a third query exploration interface offering a third plurality of different user-selectable options for structured exploration based on the new user query based on the third specific query cluster, wherein the common query structure, the second common query structure, and the third common query structure each correspond to a topic associated with the new user query, and different user-selectable options of each exploration interface are associated with different queries related to a corresponding topic.

6. The method of claim 1, wherein the new user query is a natural language query including an ordered plurality of words, and the query structure includes a subsequence of the ordered plurality of words.

7. The method of claim 1, wherein the new user query is a computer-readable query command and the query structure includes a syntactic feature of the computer-readable query command.

8. The method of claim 1, wherein the new user query matches the query structure while leaving the new variable query term unspecified, and wherein the plurality of different user-selectable options in the query exploration interface are associated with refined queries, each refined query based on specifying a different suggested query term for the new variable query term.

9. The method of claim 1, wherein the new user query includes the query structure and specifies a specific query term for the new variable query term, and wherein the plurality of different user-selectable options in the query exploration interface are associated with alternative queries, each alternative query based on replacing the specific query term with a different alternative query term.

10. The method of claim 1, further comprising determining the common query structure for a query cluster based on identifying a most popular phrase occurring in a plurality of queries in the query cluster.

11. The method of claim 1, further comprising determining the common query structure for a query cluster based on identifying a plurality of contextually-related entities mentioned in historical queries of the query cluster.

12. The method of claim 1, wherein clustering the corpus of historical queries into a plurality of query clusters includes, responsive to an initial query cluster having more than a threshold number of queries, multi-level clustering the initial query cluster into a plurality of sub-clusters.

13. The method of claim 1, further comprising determining the common query structure for a query cluster based on multi-level clustering a plurality of historical queries of the query cluster into sub-clusters based on a contextual relationship between entities mentioned in the plurality of historical queries of the query cluster.

14. The method of claim 13, wherein the contextual relationship between entities is determined based on comparing semantic vector encodings for entities mentioned in the plurality of historical queries of the query cluster.

15. The method of claim 13, wherein the contextual relationship between entities is determined based on a comparison among search context vectors derived from web search result listings associated with historical queries of the query cluster.

16. The method of claim 13, further comprising assessing entity co-occurrence vector data indicating whether each entity is mentioned by each document of a corpus of documents, wherein the contextual relationship between entities is determined based on comparing the entity co-occurrence vector data for a plurality of entities mentioned in historical queries in the query cluster.

17. The method of claim 16, wherein the corpus of documents includes a plurality of web tables, each web table associated with an index of entities, and the entity co-occurrence vector data is based on an inverted index indicating, for each entity, a listing of each web table with an associated index including the entity.

18. The method of claim 16, wherein the entity co-occurrence vector data is assessed selectively for different pairs of entities, including selectively assessing the entity co-occurrence vector data solely with regard to pairs of entities satisfying a hash collision property.

19. A computing system, comprising:
- a logic subsystem;
- a communication subsystem; and
- a storage device holding instructions executable by the logic device to:
  - cluster a corpus of historical queries into a plurality of query clusters, each query cluster of the plurality being clustered to include historical queries demonstrating a common query structure for that query cluster, and each query structure including a variable query term;
  - for each query cluster of the plurality, identify a set of variable query terms in the historical queries;
  - receive a new user query, from a user device via the communication subsystem;
  - identify a query structure of the new user query;
  - select a specific query cluster matching the query structure of the new user query;
  - identify a new variable query term in the query structure of the new user query; and
  - provide, to the user device via the communication subsystem, a query exploration interface offering a plurality of different user-selectable options for structured exploration based on the new user query, each of the plurality of different user-selectable options corresponding to a particular variable query term in the identified set of variable query terms for the specific query cluster identified as matching the query structure of the new user query.

20. A method for a search engine to provide domain-agnostic options for structured exploration based on a query, comprising:
- clustering a corpus of historical queries into a plurality of query clusters, each query cluster of the plurality being clustered to include historical queries demonstrating a common query structure for that query cluster, and each query structure including a variable query term;
- for each query cluster of the plurality, identifying a set of variable query terms in the historical queries;
- receiving a new user query;
- identifying a first query structure of the new user query and a second, different query structure of the new user query;
- selecting a first query cluster matching the first query structure of the new user query, and selecting a second query cluster matching the second query structure of the new user query;
- identifying a first variable query term corresponding to the first query structure, and identifying a second variable query term corresponding to the second query structure; and
- providing a search interface including a first plurality of different user-selectable options for replacing the first variable query term, and a second plurality of different user-selectable options for replacing the second variable query term, wherein:
  - a first user-selectable option of the search interface is selectable to cause the search interface to provide results for a first exploratory query based on the new user query with the first variable query term replaced based on the first user-selectable option; and
  - a second user-selectable option of the search interface is further selectable to cause the search interface to provide results for a second, further exploratory query based on the new user query with the second variable query term replaced based on the second user-selectable option.

* * * * *